United States Patent
Johnson et al.

[15] 3,693,537
[45] Sept. 26, 1972

[54] UTENSIL FOR USE IN COOKING TORTILLAS

[72] Inventors: Charles R. Johnson, Route 11, Box 144K, San Antonio, Tex. 78213; Jack F. Henderson, 554 E. Congress, San Antonio, Tex. 78214

[22] Filed: Aug. 3, 1970

[21] Appl. No.: 60,544

[52] U.S. Cl. .................................................99/426
[51] Int. Cl. ............................................A47j 43/18
[58] Field of Search........99/426, 379, 383, 402, 403, 99/416, 427, 448, 449; 15/144, 236; 294/7, 8.5, 33

[56] References Cited

UNITED STATES PATENTS

| | | | |
|---|---|---|---|
| 2,563,422 | 8/1951 | Sabo | 294/33 |
| 3,291,476 | 12/1966 | Calkin | 294/33 X |
| 2,506,305 | 5/1950 | Maldonado | 99/246 |
| 2,792,774 | 5/1957 | Veach | 99/426 |
| 2,814,981 | 12/1957 | Wendel | 99/426 |
| 2,847,933 | 8/1958 | Pate | 99/426 |
| 2,957,404 | 10/1960 | Richardson | 99/426 |
| 3,020,826 | 2/1962 | Silva | 99/426 |
| 3,511,172 | 5/1970 | Jones | 99/426 |

*Primary Examiner*—Walter A. Scheel
*Assistant Examiner*—Arthur O. Henderson

[57] ABSTRACT

This invention consists of a piece of metal that is basically U-shaped when viewed from the end and as half of a disk when viewed from the front, and to which is secured a handle made of a strip of spring steel or the like. The aforesaid piece of metal is provided with a plurality of equally spaced openings, preferably round, for the draining of cooking oil from the tortillas when they are lifted from a skillet (frying pan).

1 Claim, 2 Drawing Figures

PATENTED SEP 26 1972

3,693,537

INVENTOR
CHARLES R. JOHNSON
JACK F. HENDERSON

UTENSIL FOR USE IN COOKING TORTILLAS

This invention relates to cooking utensils; more particularly, to a utensil for use in cooking tortillas and the like.

It is the principal object of this invention to provide a utensil for use in cooking tortillas that embodies both a body member for forming or lifting the tortillas or any other similar Spanish or Mexican type of food while it is being cooked in a skillet or the like.

Another object of this invention is to provide a utensil for use in cooking tortillas or the like, the tortillas having morsels of meat, vegetables, or even salads placed therein, as will be understood by those experienced in the art.

Another object of this invention is to provide a utensil for use in cooking tortillas, the utensil being readily cleaned in a minimum of time and with a minimum of effort, factors that are most important in a restaurant where time is normally at a premium.

Still another object of this invention is to provide a utensil for use in cooking tortillas, the utensil being easily manufactured by any company having a sheet metal press, the utensil being produced to retail at a price attractive to anyone who cooks tortillas or the like.

Other objects and advantages of this invention will no doubt appear as the reading of this specification and its appended claims proceeds and the accompanying drawing is examined in connection therewith.

In the two views of the accompanying drawing like parts of this invention are indicated by like reference numbers. The reference number 5 indicates this invention in its entirety.

Figure 1:
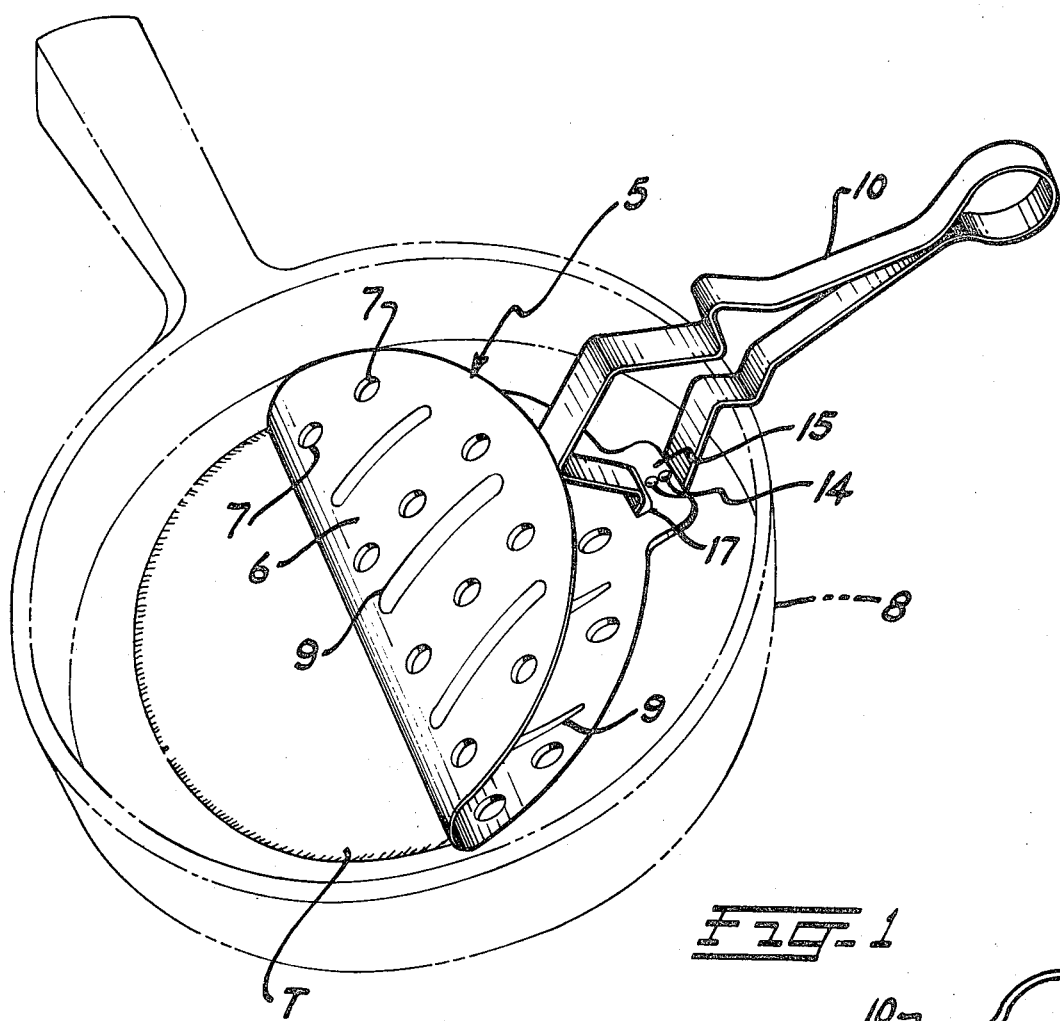
FIG. 1 is a pictorial view of this invention in a typical skillet in which figure, only the invention is shown in solid lines.

Directing ones attention first to FIG. 1 of the drawing it will be seen that this invention consists of a single sheet of flat metal 6 (preferably stainless steel) that is circular in shape and which has been bent into a member that is U-shaped when viewed from the end. The just-mentioned sheet of metal 6 is provided with a plurality of equally spaced round openings 7 for the draining of grease as the tortilla is being cooked and then lifted from the skillet. The skillet is indicated in the accompanying drawing by the reference number 8. The aforesaid sheet of metal 6 is also provided with a plurality of elongated depressions 9 in order to provide a certain amount of rigidity to the invention. A handle 10 that is a single strip of spring steel or the like is configurated in the shape shown in the accompanying drawing. Here it is to be observed that the handle 10 has a V-shaped portion 11 in each side thereof that permits the handle to rest in a desired predetermined position on the upper edge 12 of the aforesaid skillet 8 when the tortillas are being cooked in the skillet.

Figure 2:
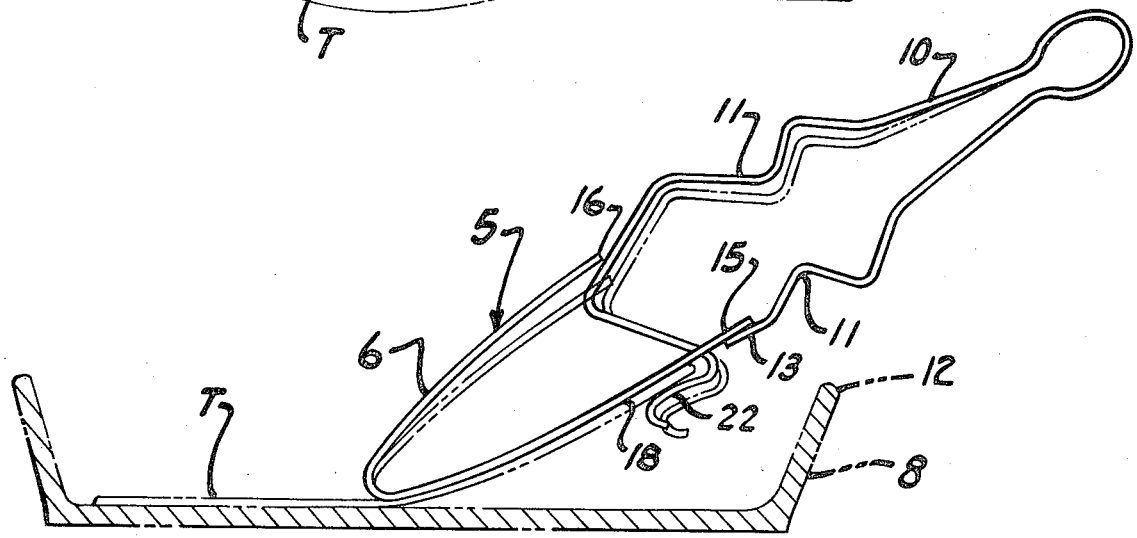
FIG. 2 is an end view of FIG. 1, showing the invention in solid lines and also showing in solid and dotted lines positions to which portions of the invention are moved when the handle is squeezed to permit the invention to grasp an edge of a tortilla.

Continuing to look at FIG. 1 of the accompanying drawing as well as at FIG. 2 it will be seen that one end 13 of the aforesaid handle 10 is secured by rivets 14 or any other desired means to the underside of lip 15 of the aforesaid sheet of flat metal 6. The other end of the just-mentioned handle 10 passes under the edge 16 of the often-mentioned flat sheet of metal 6 and is then bent downward and outward to pass through the elongated opening 17 in the aforesaid lip 15 to be bent up under the edge 18 of the flat sheet of metal 6. This novel construction will permit the handle to also take hold of a portion of the tortilla T that is to be formed by means of this invention, as will be shortly described.

The way in which this invention is used is as follows: The tortilla T is placed in the aforesaid skillet 8 and cooked in a small amount of oil and then turned over since the tortilla is being held by the free end 22 of the aforesaid handle 10. Tortillas are normally soft when being cooked and can be shaped by manipulation of this novel utensil into the U-shaped configuration that will permit any meat or other ingredients to be placed in the same, as will be understood by those experienced in the art.

This invention is subject to any and all changes and/or modifications that one may care to make in so long as the changes and/or modifications fall within the scope and intent of the appended claims.

What we now claim as new and desire to secure by grant of Letters Patent is:

1. A utensil for cooking tortillas, comprising a perforated disc of sheet metal which is bent to a U-shape to form a U-shaped plate, an elongated handle made of a single strip of spring steel, one end of said handle secured to the free end of one leg of the U-shaped plate, the said U-shaped plate having an elongated opening adjacent to the handle securing means, the strip of spring steel being bent along itself to form said handle and extending to contact the inner surface of the other leg of the U-shaped plate, the free end of said handle beyond said point of contact being further bent and extending through said elongated opening and bent after passing through said opening to form a clamping or holding end to contact the outer surface of the first mentioned leg of the U-shaped member.

* * * * *